United States Patent [19]
Nagasaka et al.

[11] 3,826,966
[45] July 30, 1974

[54] DEVICE FOR DRIVING A STEPPING MOTOR

[75] Inventors: Nagahiko Nagasaka; Katsuji Shinohara, both of Kitakyushu, Japan

[73] Assignee: Kabushiki Kaisha Yaskawa Denki Seisakusho, Fukuoka-ken, Japan

[22] Filed: Aug. 6, 1973

[21] Appl. No.: 385,629

[30] Foreign Application Priority Data
- Aug. 10, 1972 Japan.............................. 47-80582
- Mar. 16, 1972 Japan.............................. 47-31120
- Mar. 22, 1972 Japan.............................. 47-33711

[52] U.S. Cl. ............ 318/696, 318/341, 321/45 ER, 318/138
[51] Int. Cl. .......................................... H02k 29/04
[58] Field of Search .......... 318/138, 696, 685, 341; 321/45 ER

[56] References Cited
UNITED STATES PATENTS
| | | | |
|---|---|---|---|
| 3,336,516 | 8/1967 | Kelley.................. | 318/139 |
| 3,560,818 | 2/1971 | Amato.................. | 318/138 |
| 3,648,144 | 3/1972 | Rosen................... | 318/696 |
| 3,767,993 | 10/1973 | Yablonski.............. | 318/696 |

*Primary Examiner*—G. R. Simmons
*Attorney, Agent, or Firm*—Fitzpatrick, Cella, Harper & Scinto

[57] ABSTRACT

A device for driving a stepping motor in which instead of provision of resistors in series to driving coils of the stepping motor, which is a conventional method of supplying electrical current to the driving coils, constant current choppers and reactors are provided, and reactive current is regenerated to a power source through diodes or circulated to the driving coils.

A device for driving a stepping motor comprising: a d.c. power source; constant current choppers for supplying constant current to the driving coils of the stepping motor, or a load, from the power source the driving coils being classified into three or four groups corresponding to three or four phases; reactors or, if necessary, the d.c. field coils of the stepping motor; four transistor switches or a three-phase bridge inverter for regulating the flow of current to the driving coils; a flywheel diode or two diodes cross-connected for the circulation of energy residual in the load when the choppers are off; and a circuit for regenerating to the power source energy residual in the driving coils when the switches or the inverter is off. In addition, the stator and rotor of the stepping motor are of the same type in construction as those of an inductor type synchronous rotor, and while driving coils corresponding to two phases being energized, all the driving coils are energized one phase by one phase.

14 Claims, 32 Drawing Figures

FIG. I

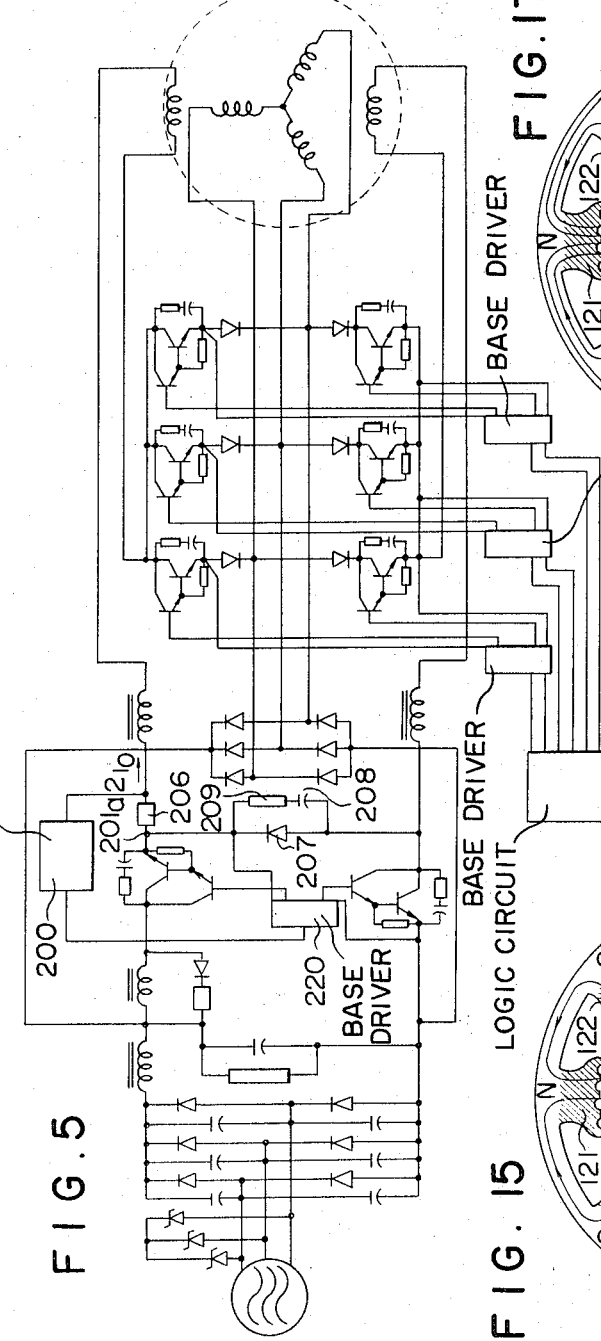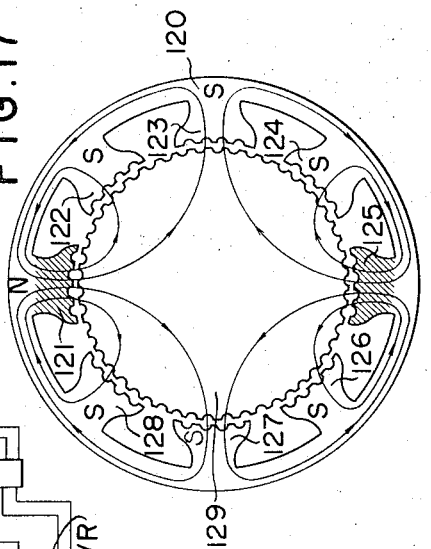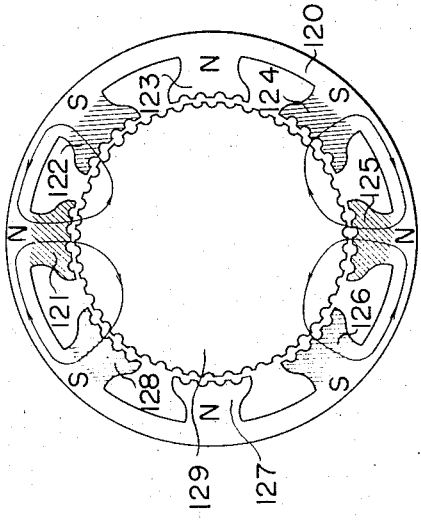

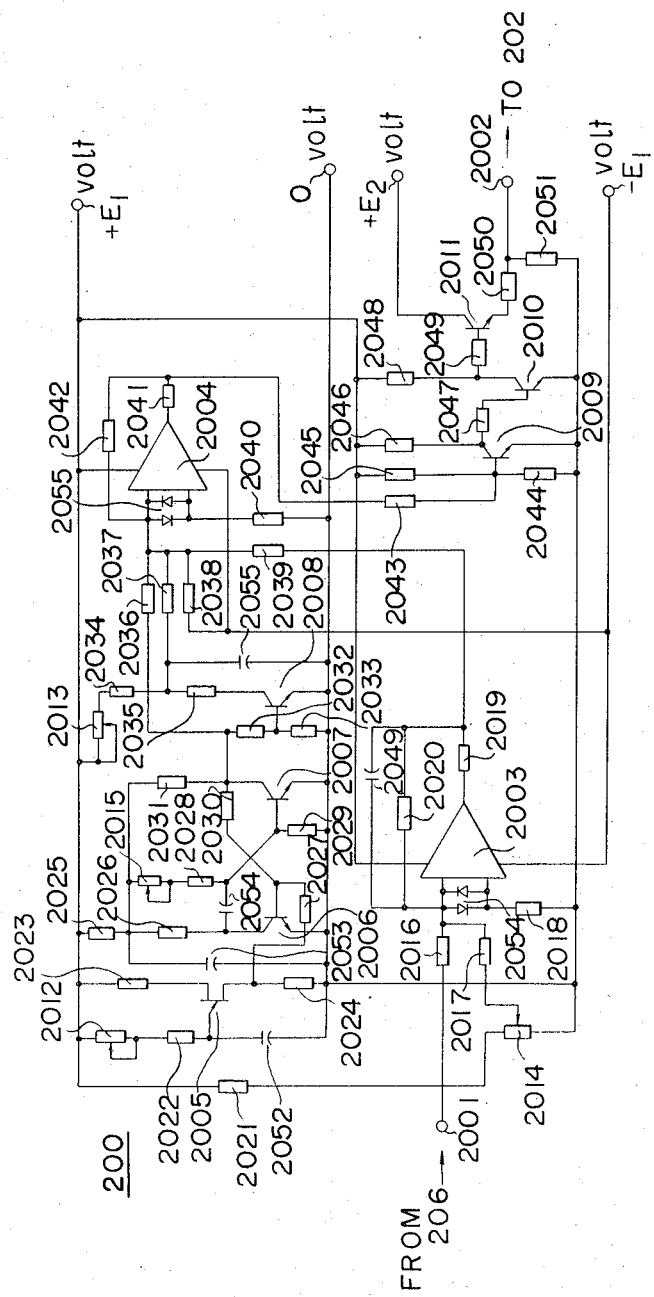

FIG. 9

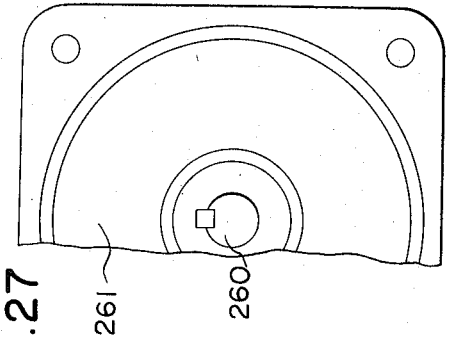
FIG.27
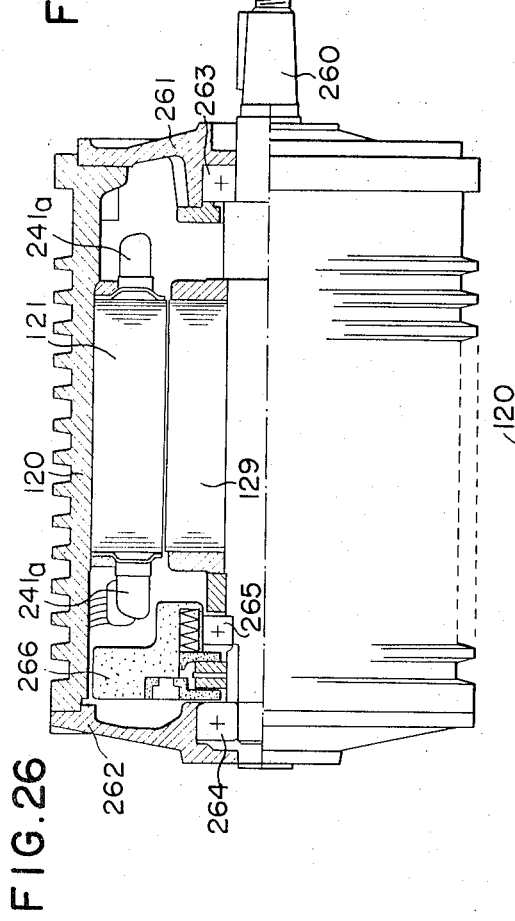
FIG.26
FIG.28
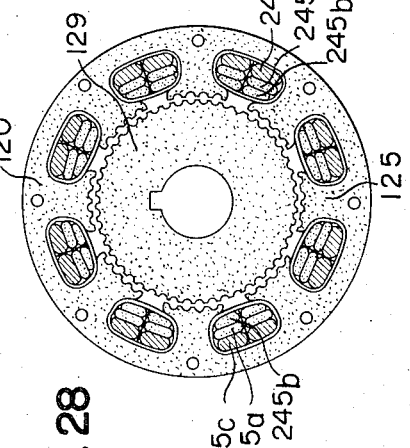
FIG.11

FIG. 12
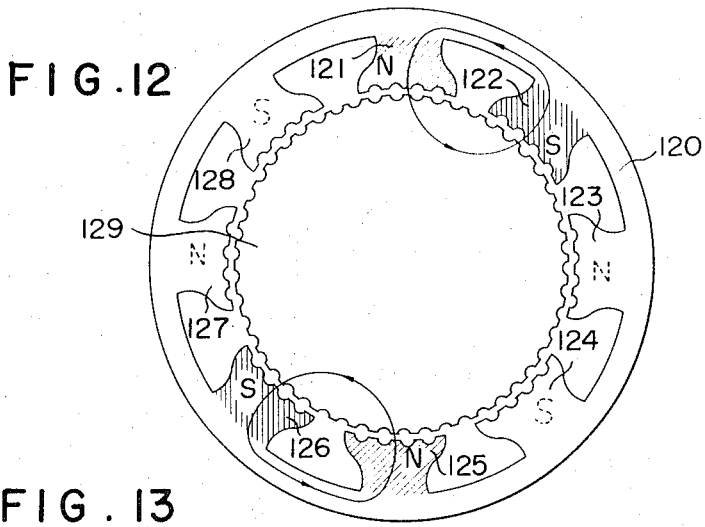
FIG. 13
|  | 121 | 122 | 123 | 124 | 125 | 126 | 127 | 128 |
|---|---|---|---|---|---|---|---|---|
|  | N | S | N | S | N | S | N | S |
| 1↑ | ○ | ○ |  |  | ◍ | ○ |  |  |
| 2↑ |  | ○ | ○ |  |  | ○ | ○ |  |
| 3↑ |  |  | ○ | ○ |  |  | ○ | ○ |
| 4↑ | ◍ |  |  | ○ | ○ |  |  | ○ |
FIG. 18
|  | 121 | 122 | 123 | 124 | 125 | 126 | 127 | 128 |
|---|---|---|---|---|---|---|---|---|
| 1↑ | ○ |  |  |  | ○ |  |  |  |
| 2↑ |  | ○ |  |  |  | ○ |  |  |
| 3↑ |  |  | ○ |  |  |  | ○ |  |
| 4↑ |  |  |  | ○ |  |  |  | ○ |
FIG. 14
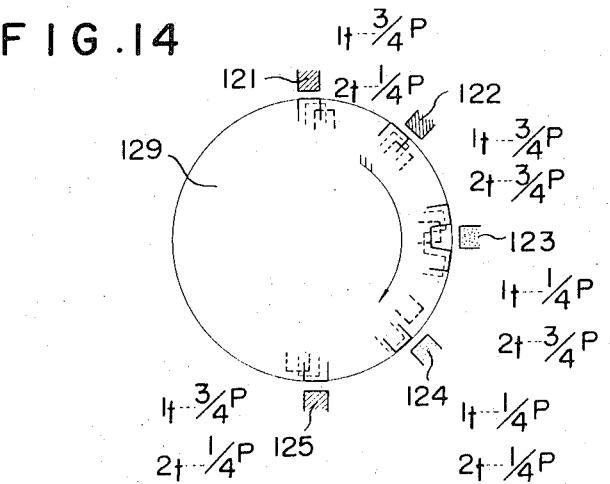

DEVICE FOR DRIVING A STEPPING MOTOR

BACKGROUND OF THE INVENTION

This invention relates to improvement of a device for driving a stepping motor (hereinafter referred to as "a driving device" when applicable) and more particularly to provision of a driving device operable efficiently which is provided to a constant current chopper circuit and can effectively utilize the reactive current of the stepping motor.

In a conventional driving device, resistors are connected in series to driving coils of a stepping motor so that, when exciting current is supplied to the driving coils, its time constant be made small thereby to attain a step rising characteristic of the exciting current. It is obvious that Joule heat loss due to these resistors causes various difficulties in the operation of the stepping motor with increase of the exciting current.

SUMMARY OF THE INVENTION

Accordingly, a first object of this invention is to eliminate the above-described difficulties accompanying the conventional driving devices.

A second object of the invention is to provide a first device for driving a stepping motor with driving coils classified into four groups corresponding to four phases, in which electric current flows in the driving coils of the stepping motor through a constant current chopper and reactors from a d.c. power source, the flow of the electric current being controlled by four switching transistors connected in series to the driving coil thereby producing a torque, and, when the switching transistors become off, or non-conductive, energy residual in the reactors and driving coils is fed back to the d.c. power source through terminals of the driving coils.

A third object of the invention is to provide a second device for driving a stepping motor which is attained by improving the first device in such a manner that d.c. field coils of the stepping motor energized at all times are connected in series to the reactors mentioned in the second object, respectively.

A fourth object of the invention is to provide a third device for driving a stepping motor by improving the second device in such a manner that the d.c. field coils of the second device are connected directly to the d.c. power source.

A fifth object of the invention is to provide a fourth device for driving a three-phase stepping motor, in which electric current flows in driving coils of the stepping motor through constant current choppers, reactors and transistor inverters, the transistor invertors being controlled to generate a torque, energy residual in a driving coil corresponding to a transistor invertor which is changed to non-conductive state from conductive state is regenerated to the d.c. power source through diodes, and diodes connected in cross state to the input and output sides of the constant current choppers so that, when the current choppers become off, energy in the motor side is fed back to the d.c. power supply.

A sixth object of the invention is to provide a fifth device for driving a stepping motor by improving the fourth device in such a manner that the cross-connected diodes of the fourth device is replaced by a flywheel diode connected on the motor side of the constant current choppers.

A seventh object of this invention is to provide a sixth device for a stepping motor which can produce a torque by variable magnetic reluctance, the stepping motor having a stator and a rotor of the same type in construction as those of an inductor type synchronous motor, that is, the stepping motor comprising the rotor made of a laminated core with teeth, and field coils wound on a stator having 4n poles (where n representing the integer) opposing ones of the field coils producing fields different in polarity from each other thereby generating revolving magnetic field.

An eighth object of the invention is to provide a seventh device for driving a stepping motor in which the stepping motor is one employed in the second device or the third device and is of the same in construction as an inductor type synchronous motor, the stepping motor comprising a rotor having teeth and made of a laminated core which is excited so as to be homopolar in an end thereof and a stator having 4n poles (where n representing the integer) field and wound by a pair of field coils to produce a torque.

A ninth object of the invention is to provide an eighth device for driving a stepping motor by improving the seventh device, that is, by winding d.c. field coils on the stator of the stepping motor employed in the seventh device so as to render bipolar the end of the rotor.

A tenth object of the invention is to provide a ninth device for driving a stepping motor by improving the eighth device, that is, by winding field coils on the field poles of the stator of the stepping motor employed in the eighth device so that the end of the rotor of the stepping motor in the eighth device be excited to have heteropolar, or to have pairs of north and south poles.

An eleventh object of the invention is to provide a tenth device for driving a stepping motor in which the stepping motor is one employed in the fourth device or the fifth device and being the same in construction as an inductive type synchronous motor, the stepping motor comprising a stator having 3n field poles (where n representing the integer) each wounded by driving coils classified into three groups corresponding to three phases and field coils wound on the stator so that an end of the rotor be excited to be bipolar, or to have a north and a south pole.

A twelfth object of the invention is to provide an eleventh device for driving a stepping motor by improving the tenth device so that d.c. field coils be wound on field ples of a stator.

The manner in which the foregoing objects and other objects are achieved by this inventin will become more apparent from the following detailed description and the appended claims when read in conjunction with the accompanying drawings, in which like parts are designated by like reference numerals or symbols.

BRIEF DESCRIPTION OF THE DRAWINGS

In the accompanying drawing:

FIG. 5 is a schematic circuit diagram, partly as a block diagram, illustrating a fifth example of the driving device which is attained by modifying the driving device shown in FIG. 4, or the fourth driving device, so that, when the constant current choppers are off, energy residual in the motor side is fed back to the motor side again through a flywheel diode;

FIG. 6 is a schematic diagram, partly as a block diagram, illustrating a constant current chopper control circuit 200 in FIGS. 1 through 5;

FIG. 9 is a circuit diagram illustrating a base driver in FIGS. 4 and 5 which operates to regulate and amplify outputs, from the control circuit shown in FIG. 8 thereby to control the transistor inverters;

FIG. 11 is connecting diagrams of the driving coils arranged in the stepping motor shown in FIG. 10;

FIGS. 12 through 18 are diagrams provided for the explanation of principles on rotation of the stepping motor;

FIG. 26 is a side elevational view, with the upper half cut away, illustrating the stepping motor shown in FIG. 24;

FIG. 27 is a front view, partly cut away, of the stepping motor shown in FIG. 25;

FIG. 28 is a cross-sectional view taken along line 28—28 in FIG. 26;

DETAILED DESCRIPTION OF THE INVENTION

Figure 1:
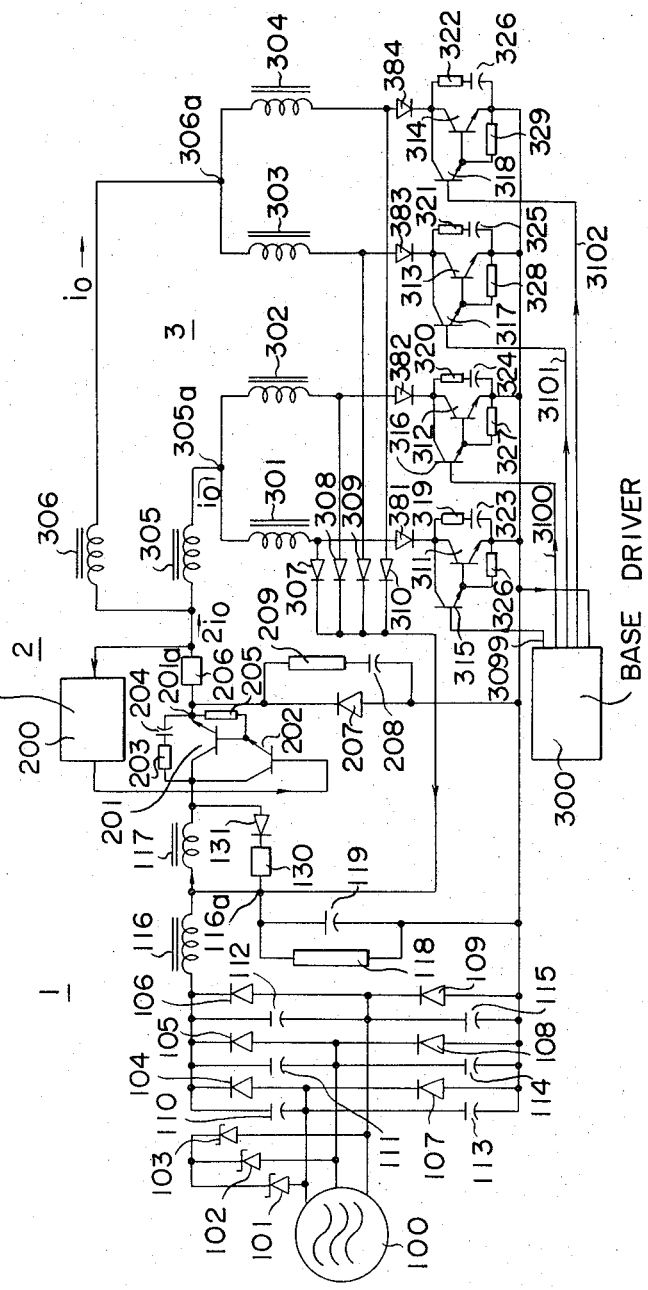
FIG. 1 is a schematic circuit diagram, partly as a block diagram, illustrating a first example of the device for driving stepping motor (hereinafter referred to as a driving device when applicable) according to this invention in which driving coils of the stepping motor are classified as four phases and, while driving coils corresponding to two phases being energized, all of the driving coils are energized alternately one phase by one phase.

A first example of the driving devices according to this invention is illustrated in FIG. 1 in which driving coils of a stepping motor are classified into four groups corresponding to four phases, and while driving coils corresponding to any two phases are energized, the energization of all of the driving coils is effected in order one phase by one phase.

More specifically, in the first driving device shown in FIG. 1, electric current is supplied from an a.c. constant power source 100 through a surge absorbing circuit comprising Zener diodes 101–103 and capacitors 110–115 to a converter circuit comprising diodes 104–109. A smoothing circuit is formed by reactors 116 and 117, a resistor 118 and a capacitor 119. A circuit formed by a resistor 130 and a diode 131 shows a flywheel effect with respect to the residual energy of the reactor 117. All the elements described above forms a d.c. power source section 1.

A section indicated generally by reference numeral 2 is a constant current regulating section including: a chopper control circuit 200; a chopper circuit which comprises transistors 201 and 202, resistors 203 and 205 and a capacitor 204; and a resistor 206 operating to detect from a voltage drop thereacross a value of current regulated by the chopper circuit. The constant current regulating section 2 further comprises a flywheel circuit including a diode 207, a capacitor 208 and a resistor 209. This flywheel circuit operates to circulate load current flowing in driving coils, described later of the load when the chopper is off.

Indicated generally by reference numeral 3 is a control section for controlling the energization of, or the flow of current in, the driving coils 301 through 304 of the stepping motor. This driving coil control section 3 comprises: reactors 305 and 306; diodes 307 through 310 operating to feed back energy residual in the driving coil 301 through 304 to a point 116a of the d.c. power source section; and a circuit including transistors 311 through 318, resistors 319 through 322 and 326 through 329, capacitors 323 through 326 and diodes 381 through 384. The latter circuit operates to control the energization of the driving coils 301 through 304, or to interrupt the flow of current in these driving coils, with the aid of control command signals from a base driver 300.

When the transistor 313 is on, or conductive and current $i_o$ therefore flows in the driving coil 303, the transistor 311 is on and current therefore flows in the driving coil 301. This condition is maintained for a half cycle. Then, when it has passed by an electrical angle of 180° after the conduction of the transistor 313, the transistor 314 becomes conductive and the current $i_o$ therefore flows in the driving coil 304. In this operation, the transistor 313 has become non-conductive before the conduction of the transistor 314, and energy residual in the driving coil 303 is fed back to the point 116a of the d.c. power source section through the diode 309 for the purpose of regeneration of the energy. Furthermore, a half cycle after the conduction of the transistor 311, the transistor 312 becomes conductive.

Thus, any two driving coils corresponding to any two phase are in energization state at any time, that is, for instance, the driving coils 301 and 303, 301 and 304, 302 and 304, and so forth, are successively energized, thus forming revolving magnetic field so as to rotate the stepping motor.

Figure 2:
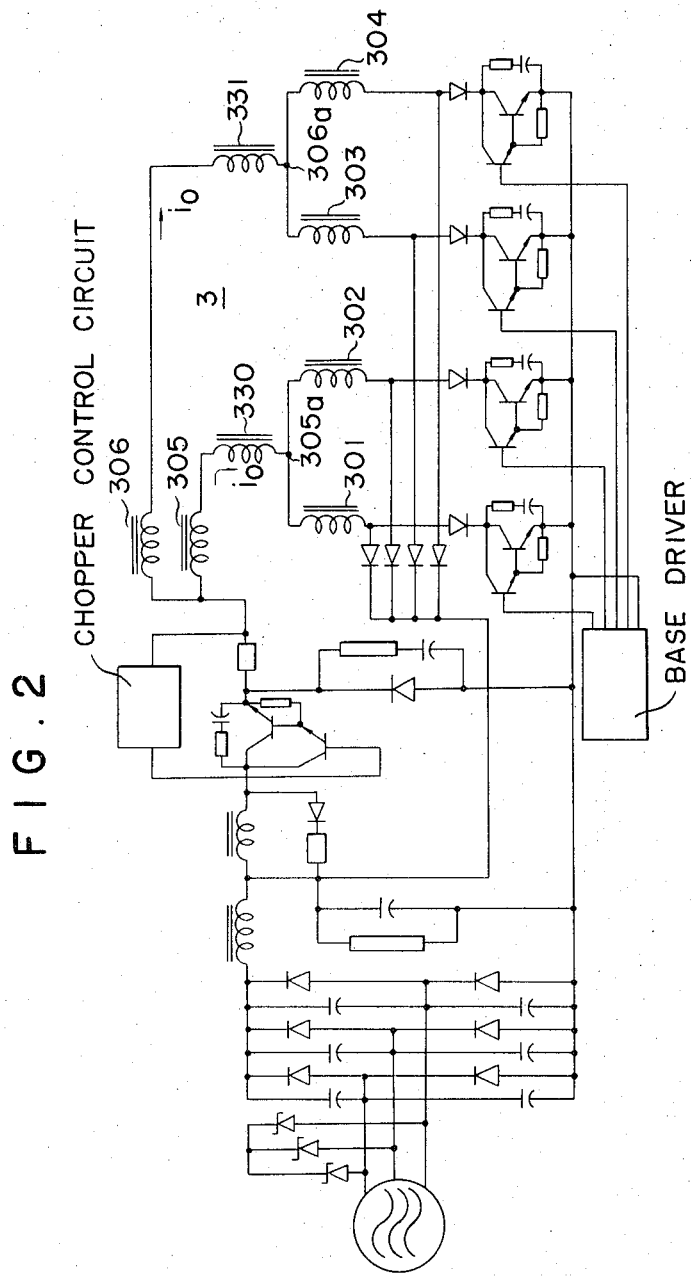
FIG. 2 is also a schematic circuit diagram, partly as a block diagram, illustrating a second example of the driving device according to the invention which is attained by modifying the driving device shown in FIG. 1, or the first driving device, so that d.c. field coils of the stepping motor in the first driving device are employed as reactors for the purpose of supplying constant exciting current.

A second example of the driving devices is shown in FIG. 2, which is a modification of the first driving device illustrated in FIG. 1. In this modification, d.c. field coils 330 and 331 of the stepping motor are connected to the output terminals 305a and 306a of the reactors 305 and 306, respectively, thereby improving the efficiency of the stepping motor. That is, the second driving device is similar in operation to the first one (FIG. 1) except for the fact that the direct current $i_o$ flows in the field coils 330 and 331.

Figure 3:
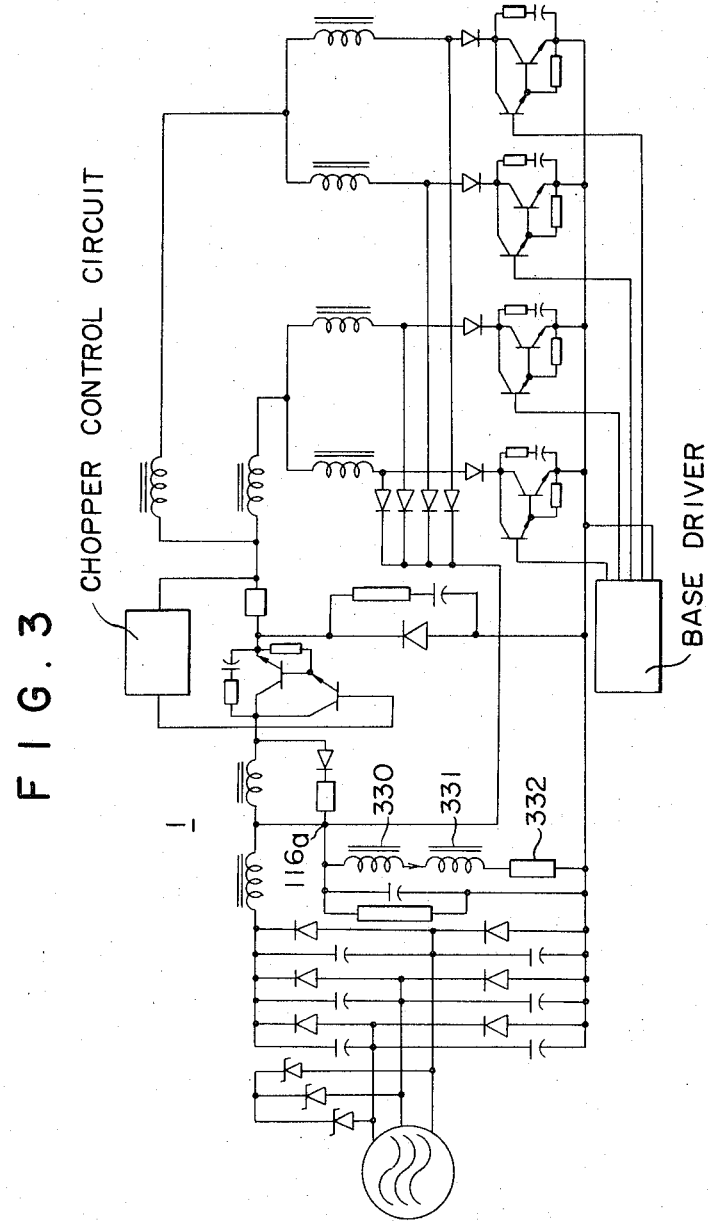
FIG. 3 is a schematic circuit diagram, partly as a block diagram, illustrating a thrid example of the driving device according to the invention which is attained by modifying the first driving device so that the d.c. field coils of the stepping motor in the first driving device are connected directly to a d.c. power source.

Another modification of the first driving device shown in FIG. 1 is illustrated in FIG. 3. As is apparent from the comparison of FIG. 1 with FIG. 3, this modification is different from the driving device shown in FIG. 1 in that a series circuit formed by d.c. field coils 330 and 331 and a resister 332 is connected to the point 116a of the d.c. power source section, or in parallel to the capacitor 119, and accordingly a constant current determined by both a voltage at the point 116a and a resistance value of the resister 332 flows in the field coils 330 and 331, that is, the current in these field coils is different from the current $i_o$ in the driving coils.

Figure 4:
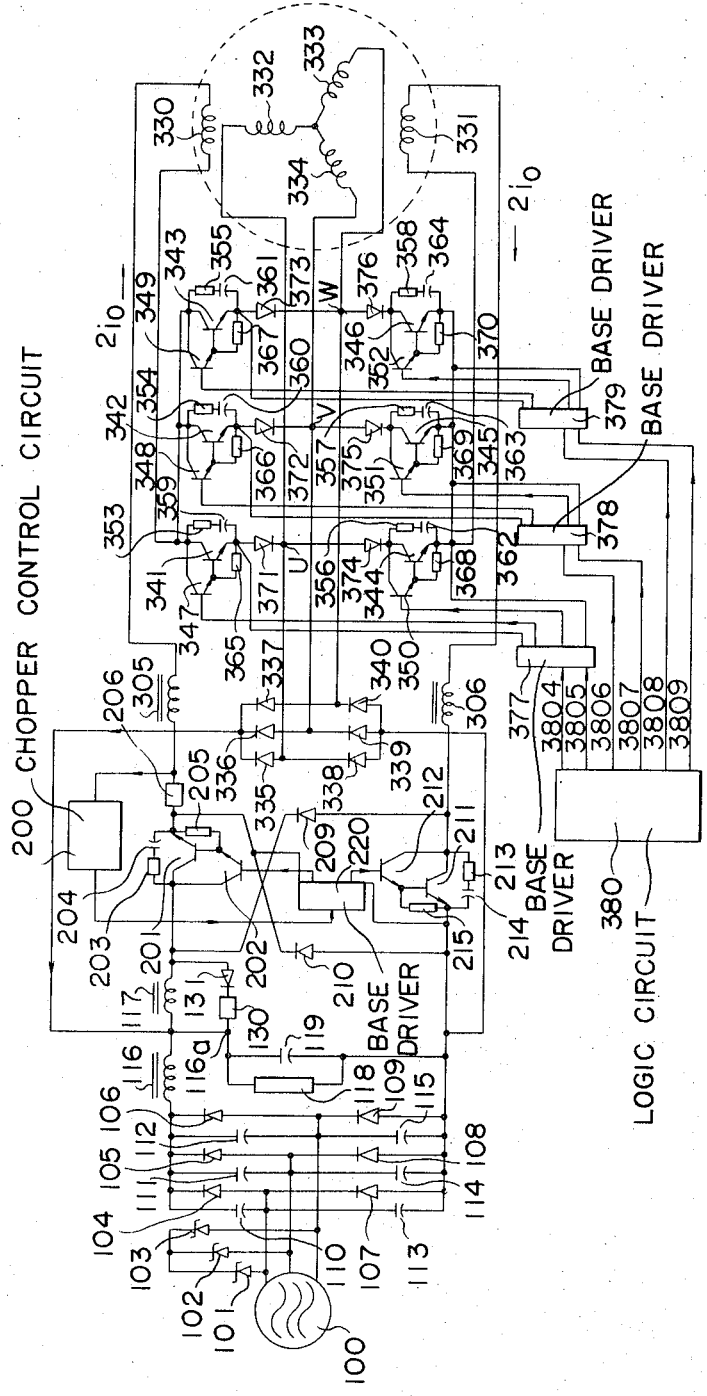
FIG. 4 is a schematic circuit diagram, partly as a block diagram, illustrating a fourth example of the device for driving a three-phase stepping motor, in which diodes are connected in cross state to both sides of constant current choppers so that, when the constant current choppers are off, energy residual in the motor side is fed back to a d.c. power source.

A fourth example of the driving devices according to the invention is shown in FIG. 4 which is a schematic circuit diagram for driving a three-phase stepping motor. In this fourth driving device, a pair of constant current choppers are provided on the positive and negative sides of the d.c. power source section 1, and when the choppers are off, energy stored in a load are regenerated to the d.c. power source through diodes 209 and 210. The fourth driving device comprises two choppers 201 and 211. One of the choppers, or the chopper 211, similarly as in the chopper 201 in FIG. 1, is formed by transistors 211 and 212, resisters 213 and 215 and a capacitor 214. A base driver 220 is provided for controlling the transistors of the two choppers.

In the driving device shown in FIG. 4, a three-phase bridge inverter is constituted by transistors 341 through 352, resisters 353 through 358 and 365 through 370, and capacitors 359 through 364. These transistors are provided with base drivers 377, 378 and 379 whose pulse distribution operations are controlled by a logic circuit 380. Driving coils 332, 333 and 334 and d.c. field coils 330 and 331 form the three-phase stepping motor. The driving coils are provided with diodes 335 through 337 which operates to feed back the commutation energy of the driving coils 332, 333 and 334 to the point 116a of the d.c. power source section. The transistors 341 through 346 are provided with protective diodes 371 through 376, respectively.

The fourth driving device described above is controlled by the two choppers so as to produce constant current $2i_o$ at all times. The flow of the constant currents is regulated by the inverters 341 through 352 so as to produce revolving magnetic field in the driving coils 332, 333 and 334. Both residual energy caused when commutation is effected by the inverters and that when the choppers are off are regenerated to the d.c. power source section, thereby improving the efficiency of the driving device and facilitating the switching operation thereof when the inverters and choppers are off.

A modification of the fourth driving device (FIG. 4) is shown in FIG. 5. While the diodes 209 and 210 are connected in cross state to the input and output sides of the two choppers in FIG. 4, a circuit formed by a diode 207, a capacitor 208 and a resister 209, for showing a flywheel effect is connected in parallel to the load side of the two choppers. In this modification, or a fifth example of the driving devices, residual energy on the load side, when the two choppers being off, is returned to the point 201a, or the input terminal of a resister 206 for detecting the constant current $2i_o$ and the residual energy thus returned is circulated in the load side.

The chopper control circuit 200 employed in this invention is illustrated in FIG. 6, which comprises: an input terminal 2001 provided for a voltage which is attained by detection of a voltage drop value corresponding to the constant current $2i_o$ through the resister 206; an output terminal 2002 provided for a control output which is produced by operation in the chopper control circuit 200; operational amplifiers 2003 and 2004; a relaxation oscillation transistor, or a so-called double base diode, 2005; transistors 2006 through 2011; variable resisters 2012 through 2015 for setting an oscillating frequency and an operational voltage; resisters 2016 through 2051; and capacitors 2052 through 2055.

Figure 7:
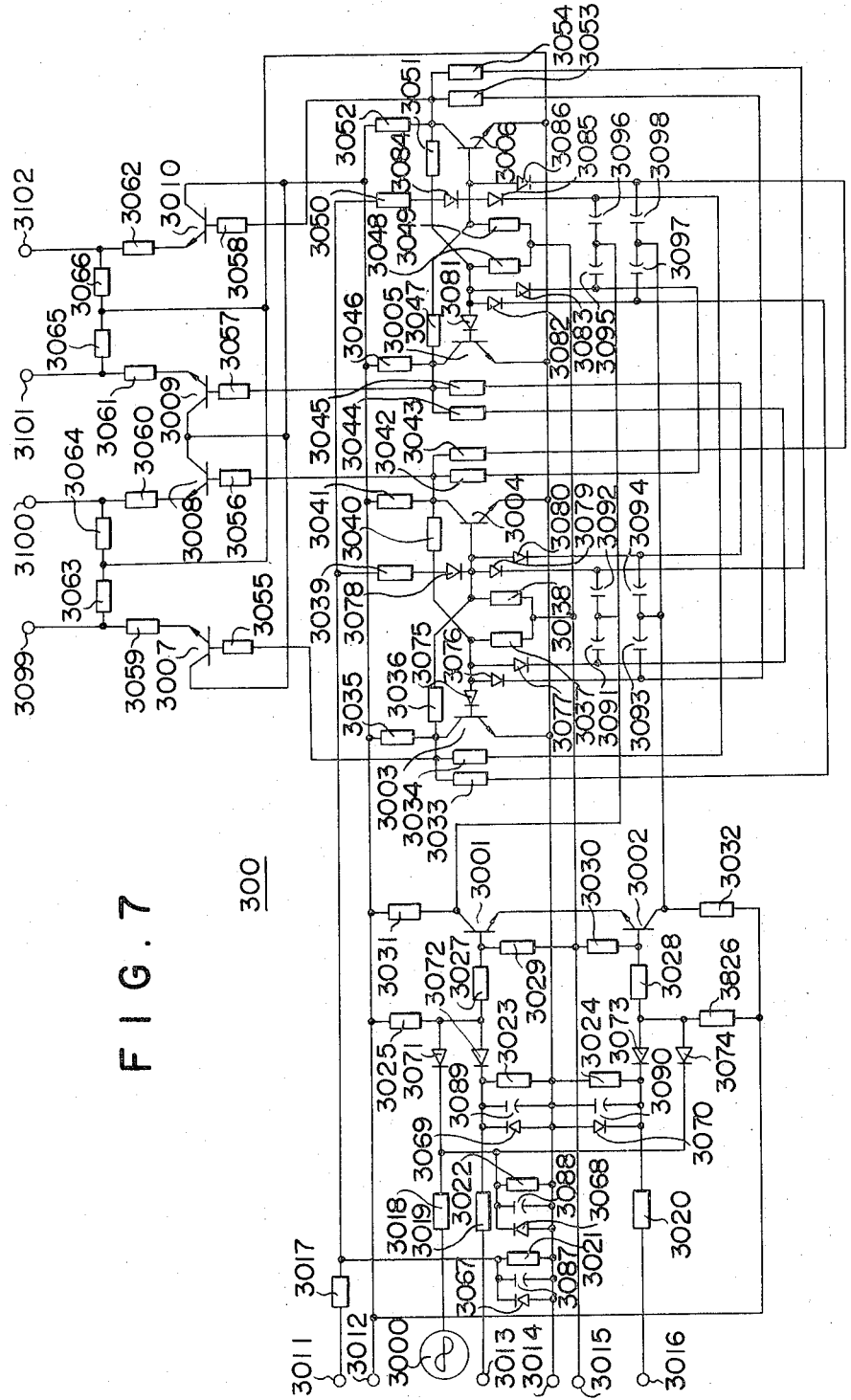
FIG. 7 is a circuit diagram illustrating a frequency division circuit 300 for controlling the on-off operation of transistor switches 311 through 3114 in FIGS. 1, 2 and 3.

A base driver suitable for the first, second and third driving devices is shown in FIG. 7. As was described before, the base driver, or a distribution circuit 300 controls the bases of the transistors 311 through 314 which in turn electronicly controls the flow of the constant current $i_o$ in the driving coils 301 through 304, respectively.

The circuit 300 described above comprises: an oscillation circuit 3000 for oscillating a frequency on which P.P.S. (pulse per second) for setting a driving speed of the stepping motor is based; transistors 3001 through 3010; resisters 3017 through 3066; diodes 3067 through 3086; and capacitors 3087 through 3098.

The transistors 3003 and 3004 and the transistors 3005 and 3006 form a shift register comprising two flip-flops. For the purpose of starting the shift register, a positive voltage (+$E_3$ volt) is applied through a resetting terminal 3011 to the transistors 3004 and 3006 thereby to initially render the latter conductive. A positive voltage (+$E_4$ volt) is applied through a terminal 3012 to the collectors of the transistors 3001 through 3010. Comand input signals (+$E_1$ volt for turning the stepping motor and O volt for stopping the latter) for rotating the stepping motor in one direction or in the opposite direction are applied through a terminal 3013 or 3016, respectively (hereinafter the rotations in one direction and in the opposite direction being referred as "forward direction" and "reverse direction," respectively when applicable). Power source terminals 3014 and 3015 are provided for O volt and −$E_1$ volt, respectively. Frequency-divided outputs from the shift register 3003 through 3006 are amplified, and then produced through terminals 3099 through 3102. The circuit 300 further comprises: noise rejecting circuit with two terminals formed by a resister 3021, a diode 3067 and a capacitor 3087; and a NAND circuit constituted by a transistor 3001, resisters 3025, 3027, 3029 and 3031, and diodes 3071 and 3072.

Figure 8:
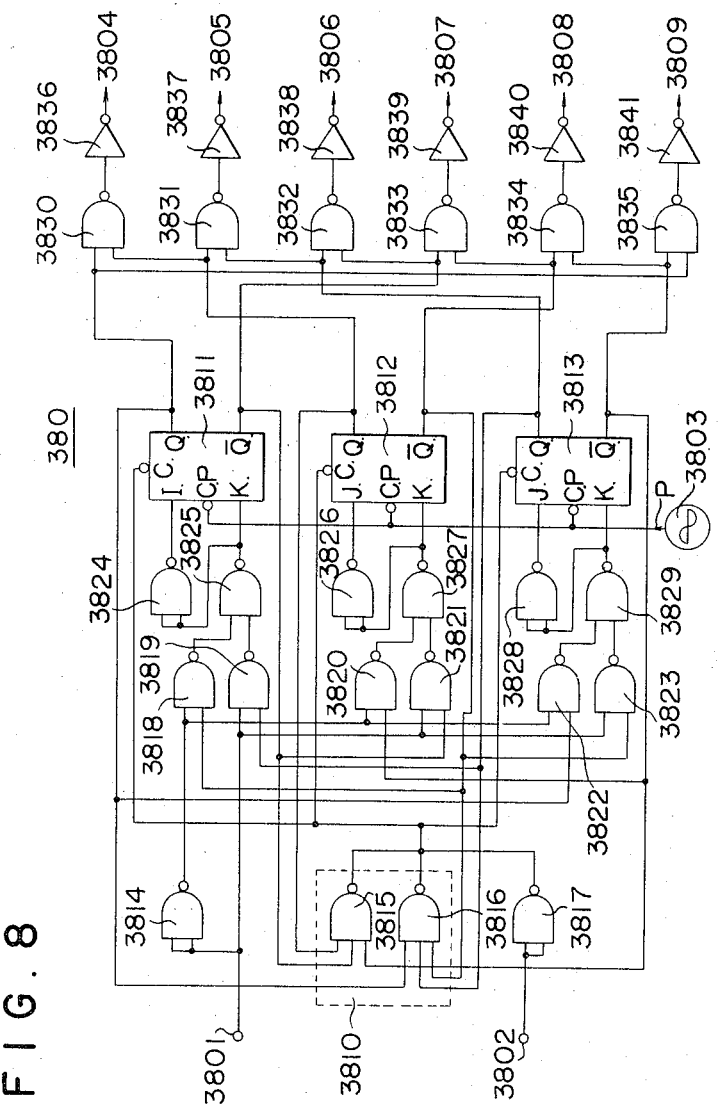
FIG. 8 is a logic circuit diagram illustrating a transistor inverter control circuit 380 in FIGS. 4 and 5.

The logic circuit 380 employed in the fourth or fifth driving device, for distributing pulses to the transistor inverters is shown in FIG. 8, in which each of the inverter transistors becomes conductive for an electrical angle of 120°.

This logic circuit 380 comprises: a terminal 3801 provided for the command signal of forward or reverse rotation to which +$E_1$ volt is applied with the forward rotation command signal while O volts with the reverse rotation command signal; a terminal 3802, or a power setting terminal of the logic circuit, to which +$E_1$ volt is applied when the logic circuit is to be set on while O volt when the logic circuit is to be set off; and a terminal 3803 for introducing clock pulses P. The logic circuit further comprises NAND elements 3814 through 3835, j.k. J.K. flip-flops 3811 through 3813, amplifiers 3836 through 3841 operating as well as phase inversion, and frequency-divided pulse outputs 3804 through 3809.

Figure 9:
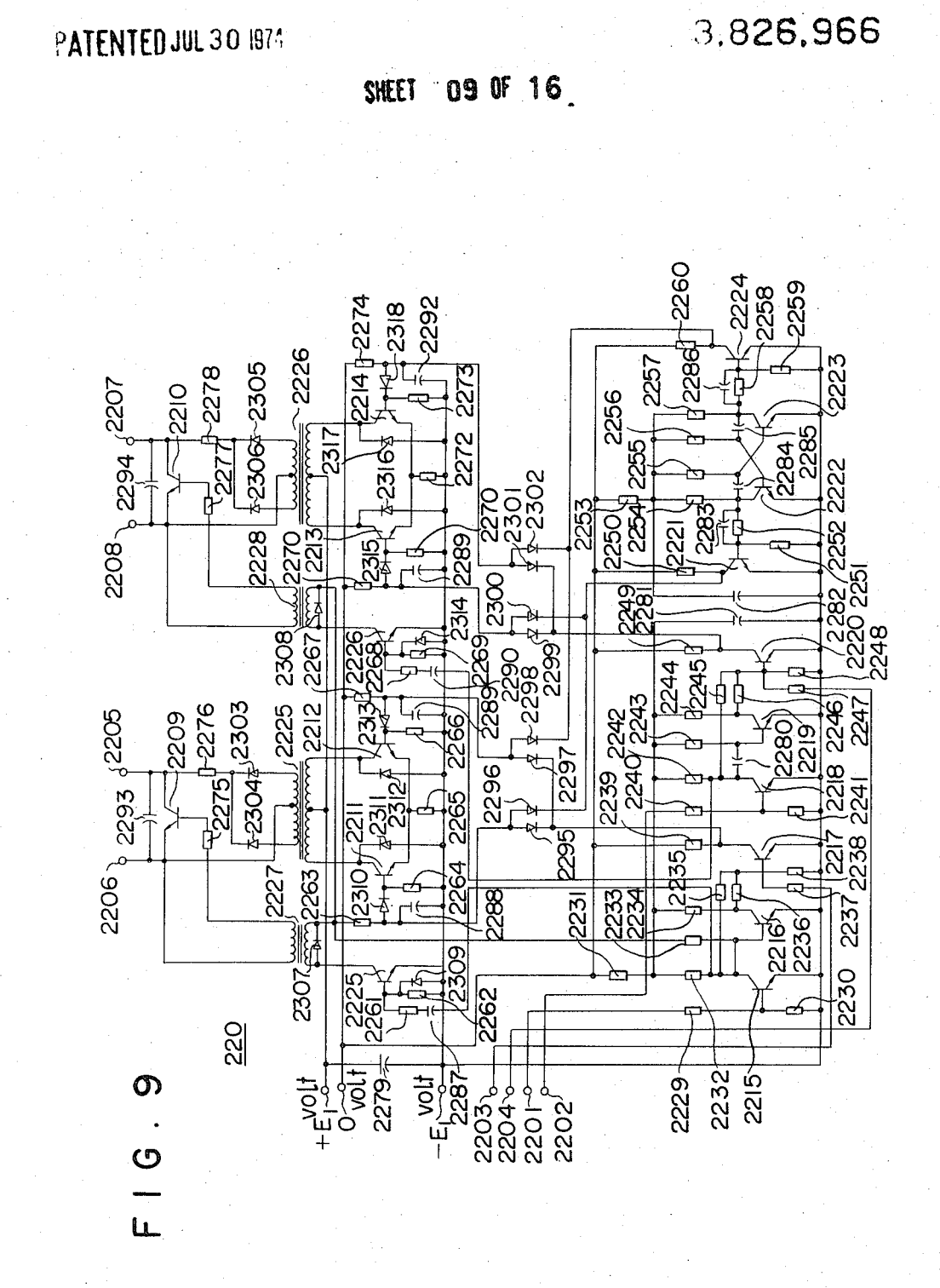

Illustrated in FIG. 9 is the base driver provided for the transistors of the choppers 201 and 211 and those of the inverters 341 through 346 described with reference to FIG. 4. The base driver is represented by reference numerals 220, 377, 378 and 379 in FIGS. 4 and 5, and serves as an electrical insulator between the operational output or frequency-divided pulse output for current control and the bases of the above described transistors.

The base driver is provided with operating signal input terminals 2201 and 2202, input terminals 2203 and 2204 for receiving emergency-stop signals, and an astable multivibrator constituted by transistors 2222 and 2223. Diodes 2295, 2297, 2299 and 2301 carry out gating operation in response to the on-off conditions of the input signals. These diodes are set on and off so that production of an output from the astable multivibrator is controlled, thus introducing rectangular waveform signals through the output terminals 2205 and 2207.

Now, the construction of a stepping motor suitable for the driving devices will be described.

Figure 10:
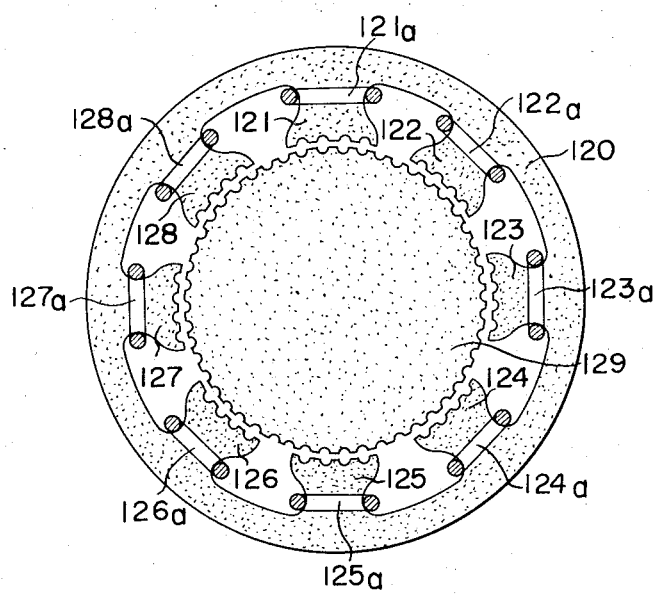
FIG. 10 is a cross-sectional view of a part of the eight-pole stepping motor of variable reluctance type applicable to the firat driving device shown in FIG. 1.

FIG. 10 is a cross-sectional view of a part of the stepping motor (hereinafter referred to as "a first motor") of variable magnetic resistance type, while FIG. 11 is a connecting diagram of the driving coils of the first motor.

Shown in FIG. 10 are a yoke 120, a rotor 129 and phase magnetic poles 121 through 128. The phase magnetic poles are classified into four groups corresponding to four phase. The excitation of the phase magnetic poles are carried out one phase by one phase thereby to rotate the stepping motor. The phase magnetic pole and the rotor are made of laminated silicon steel plates for the purpose of reducing iron loss and are provided with tooth in the form of gears so that the rotor and stator be the same in construction as those of an inductor type synchronous motor.

The number of the phase magnetic poles is $4n$ where $n$ is the integer. If it is assumed that the teeth are arranged on the entire circumference of a circle formed by the surfaces of the phase magnetic poles 121 through 128 confronted the rotor, the number of the teeth on the phase magnetic poles is 52, while the number of the teeth on the rotor is 50.

The magnetic poles 121 through 128 are provided with the driving coils 121a through 128a, respectively, which are connected as is shown in FIG. 11. In FIG. 11, each of the driving coils has an end marked by a dot(.) from which the winding of the driving coil starts, and reference numerals 111 through 114 and 115 through 118 respectively represent the input terminals and output terminals of electric current from the power source which excites the magnetic poles classified into four groups corresponding to four phase.

If it is assumed with reference to FIG. 12 that the rotor 129 rotates clockwise and currents flow from the terminal 111 to the terminal 115 and from the terminal 112 to the terminal 116 (FIG. 11) so that the phase magnetic poles 121 and 125 are magnetized to be north poles and the phase magnetic poles 122 and 126 to be south poles as indicated by shadow lines, or hatched lines, lines of magnetic force lie in the directions of the arrow lines, thereby forming a closed loop as a first phase magnetic pole → the rotor → a second phase magnetic pole → the yoke → the first phase magnetic pole. As a result, a torque increasing permeance, or decreasing magnetic reluctance, occurs due to the following reason.

When, as is shown in FIG. 14, two teeth of the rotor 129 coincide in position with those of the phase magnetic poles 121 and 125, respectively, other two teeths of the rotor 129 are set by a half of the width of one tooth off those of the phase magnetic poles 122 and 125, respectively (hereinafter a whole width of the tooth, ¾ thereof, ½ thereof and so forth being represented by 1P, ¾ P, ½ P and so forth, respectively).

More specifically, a tooth of the rotor does not coincide with that of the magnetic pole 123, a tooth of the rotor is set by ½P off that of the magnetic pole 124, a tooth of the rotor, as described above, coincides with that of the magnetic pole 125, and so forth. These tooth-confronting conditions cause the rotor 129 to rotate in a direction decreasing the magnetic reluctance.

Furthermore, in this first motor, the polarization of the poles are not such as both of the poles 121 and 122 are of the north pole while both of the poles 125 and 126 are of the south pole whereby magnetic flux generated between these poles passes through the center of the rotor. In other words, the adjacent poles 121 and 122, and 125 and 126 attract the rotor 129 by mutual induction thereby generating a torque.

The difference in number between the teeth of the rotor and those of the poles, being two for the motor described above with reference to FIG. 10, may be one for a motor having four phase magnetic poles with a four-phase power source and two for a motor having six phase magnetic pole with a three-phase power source.

FIG. 13 illustrates an excitation method in which the stepping motor shown in FIG. 10 completes one cycle in four phases. In FIG. 13, reference symbols 1t through 4t represent time instants in the four phases, respectively, and referency symbol represents a phase magnetic pole excited.

Illustrated in FIG. 14 are the degrees of offsetting conditions between the teeth of the rotor and those of the phase magnetic poles when the stepping motor shown in FIG. 10 is excited in accordance with the excitation method of FIG. 13, and the arrow representing the direction of rotation of the rotor.

FIGS. 15 through 18 illustrate special methods of alternating two-phase and three-phase excitations and a single-phase excitation.

More specifically, FIG. 15 shows the conditions of polarity and magnetic flux loops produced when the phase magnetic poles 121 through 128 are simultaneously subjected to the three-phase excitation. To the excitation method shown in FIG. 15, a method in which the two-phase excitation and the three-phase excitation are alternated as illustrated in FIG. 16 can be applied. FIG. 17 shows the conditions of polarization and magnetic flux loops in case of the single-phase excitation, while FIG. 18 illustrates an excitation method with respect to the phase magnetic poles in this case.

The exciting coils may be formed as bipolar windings to be put on opposite poles as is shown in FIGS. 11 and 12.

Figure 19:
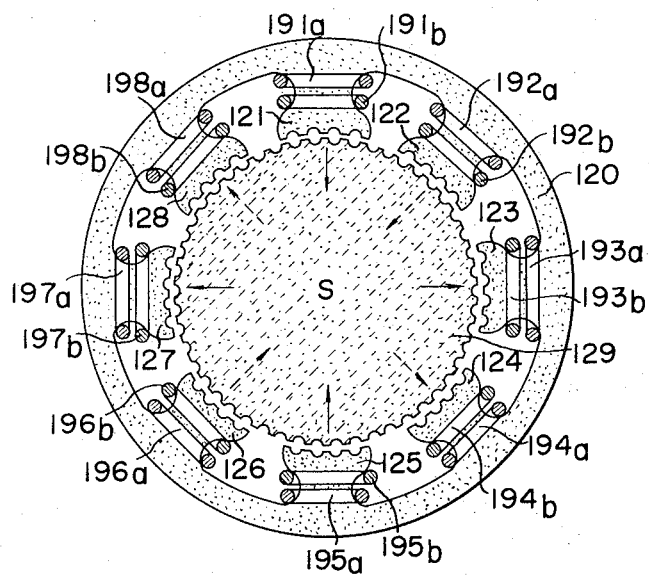
FIG. 19 is a cross-sectional diagram illustrating a part of the stepping motor employed in the driving device shown in FIG. 2 or 3, or the second driving device or the third one, in which an end of its rotor is of the homopolar type.

Another stepping motor according to this invention (hereinafter referred to as "a second motor" when applicable) which can be employed in the first, second and third driving devices described above is shown in FIG. 19 which is a cross-sectional diagram illustrating a part of the second motor. A specific feature of the second motor resides in that an end of the rotor is homopolar.

Figure 20:
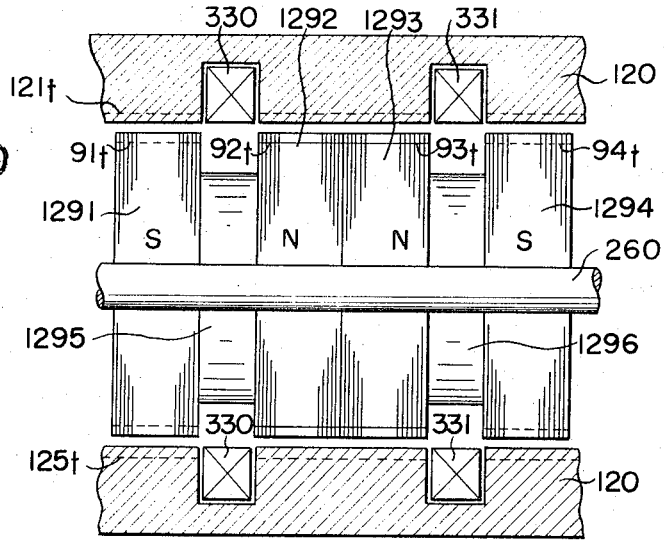
FIG. 20 is a longitudinal sectional view of a part of the stepping motor shown in FIG. 19.
Figure 21:
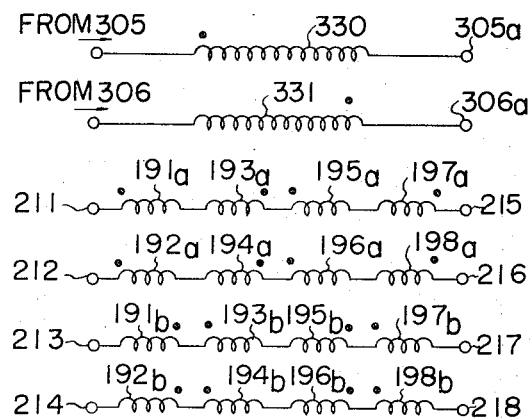
FIG. 21 is connecting diagrams of the field coils and driving coils in the stepping motor shown in FIGS. 10 and 20.

FIG. 20 is a longitudinal sectional view of the second motor, while FIG. 21 illustrates a connecting diagram of exciting coils and that of field coils wound on the stator of the second motor.

As is clear from FIG. 20, the d.c. field coils 330 and 331 cause an end of the rotor to be homopolar (for instance, to have a south pole). A magnetic substance 1295 sandwiched between laminated cores 1291 and 1292 is mounted on a rotor shaft 260, while another magnetic substance 1296 sandwiched between laminated cores 1293 and 1294 is also mounted on the rotor shaft 260. Teeth 91t and 94t, and 92t and 93t of the rotor are set by an electrical angle of 180° off teeth 121t and 125t of field poles.

The flow of electric current is maintained in the field coils 330 and 331 at all times. When driving coils 191a through 198a are energized by supplying electric current from terminals 211 and 212 to terminal 215 and 216, respectively, that is, when two phases are excited simultaneously, field poles 121 through 128 produce stator magnetic flux as indicated by directed lines (arrows), that is, a magnetic force caused by the stator magnetic flux acts so that the field poles 121, 122, 125 and 126 attract the south pole of the rotor 129 while the field poles 123, 124, 127 and 128 repulse the south pole of the rotor 129. As a result, a tooth of the rotor 129 coincides in position with that of the stator between the field poles 121 and 122, and 125 and 126. More specifically, a tooth of the rotor offsets that of the stator by ¾P at the central portion of the field poles 121 and 122 and by 180° between the field poles 123 and 124.

Then, the flow of current is suspended between the terminals 211 and 215 and instead effected between the terminals 213 and 217. As a result, energization of the driving coils 191b, 193b, 195b and 197b causes the field poles 121 and 125 to repulse the rotor 129 and the field poles 123 and 127 to attract the rotor 129.

Next, the flow of current is suspended between the terminals 212 and 216 and instead effected between the terminals 214 and 218 thereby to energized the driving coils 192b, 194b, 196b and 198b. As a result, the rotor 129 is rotated clockwise.

Figure 23:
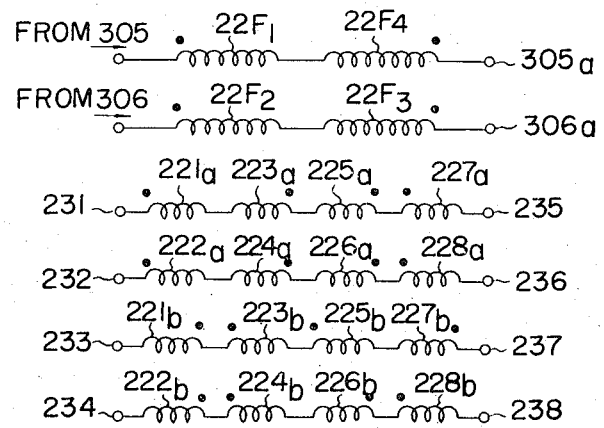
FIG. 23 is connecting diagrams of the field coils and driving coils of the stepping motor shown in FIG. 22.

Another stepping motor according to this invention (hereinafter referred to as "a third motor" when applicable) which can also be employed in the first, second and third driving devices described previously is shown in FIG. 22 which is a cross-sectional diagram illustrating a part of the third motor. A specific feature of the third motor resides in that an end of the rotor is magnetized to be bipolor, or to have both north and south poles. FIG. 23 is connecting diagrams of d.c. field coils and driving coils wound on the stator of the third motor.

Figure 22:
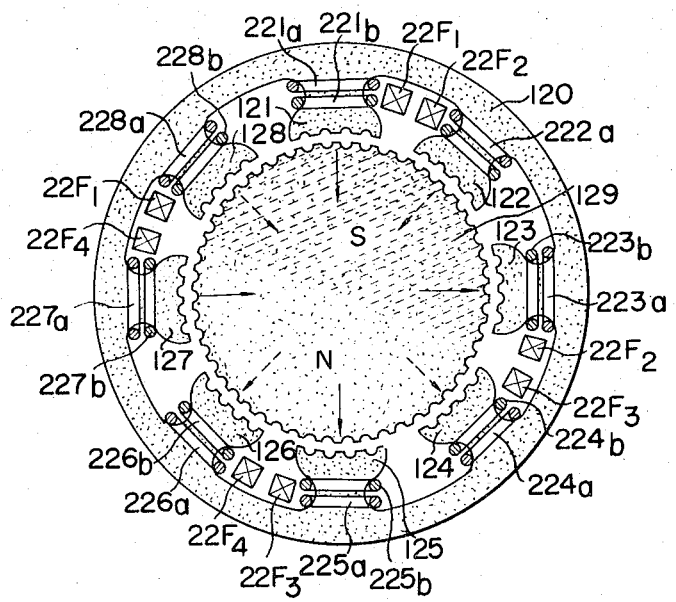
FIG. 22 is a cross-sectional view illustrating a part of the stepping motor employed in the second driving device (FIG. 2) or the third one (FIG. 3) in which a rotor is of the bipolar type.

In the third motor, direct current flows in the field coils 330 and 331 at all times, and the upper half of the rotor 129 is excited to be, for instance, a south pole while the lower half to be a north pole as is shown in FIG. 22.

Driving coils 221a through 228a and 221b through 228b, each having a winding beginning end as indicated by a dot (.) in FIGS. 23, are wound, in four phase, on field coils 121 through 128, respectively. By supplying current to the driving coils 221a through 227a, 222a 228a, 221b through 227b, and 222b through 228b, arraned into four phases, successively two phases by two phases, the rotor 129 is rotated similarly as in the second motor.

Figure 24:
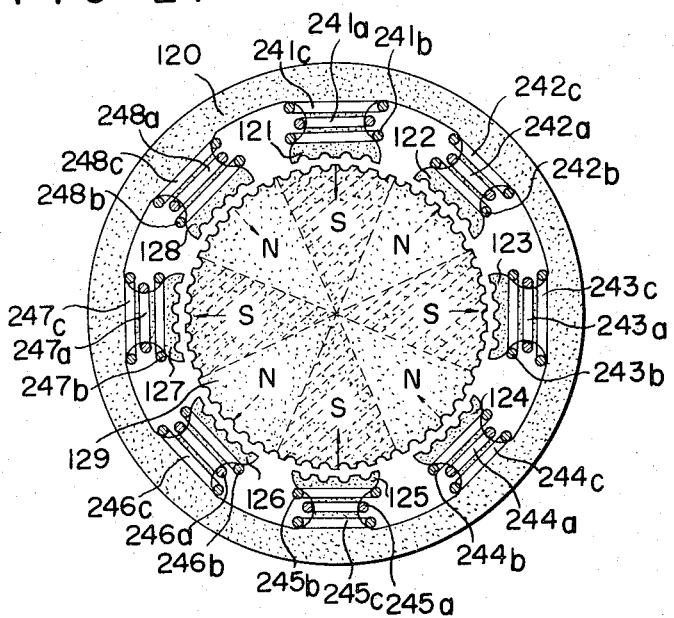
FIG. 24 is a cross-sectional view illustrating a part of the stepping motor employed in the second driving device (FIG. 2) and the third one (FIG. 3) in which a rotor is magnetized to be heteropolar.
Figure 25:
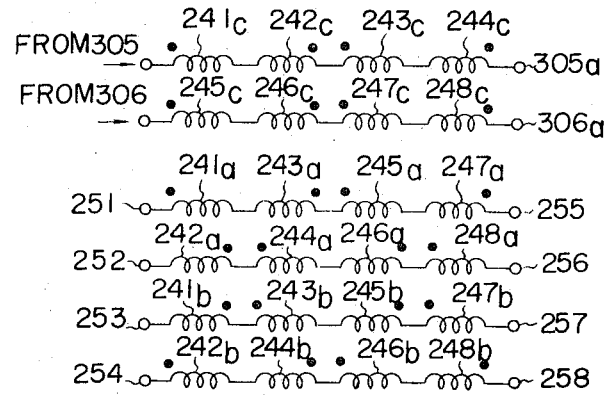
FIG. 25 is connecting diagrams of the field coils and driving coils in the stepping motor shown in FIG. 24.

Another stepping motor according to this invention (hereinafter referred to as "a fourth motor" when applicable) which can be suitably employed in the first, second and third driving devices is shown in FIG. 24 which is a cross-sectional view of a part of the fourth motor. In this fourth motor, an end of the rotor is excited to have pairs of north and south poles. FIG. 25 illustrates a connecting diagrams of d.c. field coils and driving coils wound on the stator of the fourth motor.

In this fourth motor, direct current is supplied to the field coils 241c through 248c at all times, as a result of which four pairs of north and south poles are generated in the rotor 129. Therefore, by supplying current to the driving coils 241a through 247a, 242a through 248a, 241b through 247a, and 242b through 248b, arranged into four phases, successively two phases by two phases, the rotor 129 is rotated similarly as in the second motor.

Figure 30:
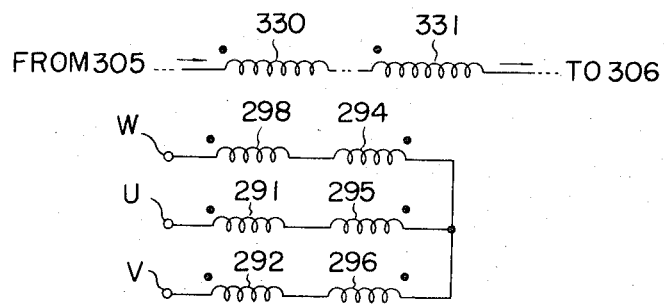
FIG. 30 is connecting diagrams of the field coils and driving coils in the stepping motor shown in FIG. 29.
Figure 29:
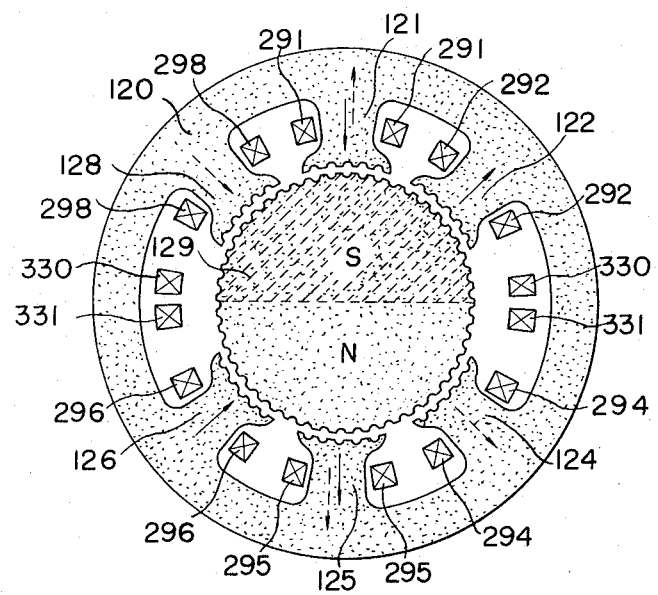
FIG. 29 is a cross-sectional view illustrating a part of the stepping motor employed in the fourth driving device (FIG. 4) or the fifth driving device (FIG. 5) in which a rotor is magnetized to be bipolar.

Another stepping motor according to this invention (hereinafter referred to as a fifth motor when applicable) is shown in FIG. 29 which is a cross-sectional diagram illustrating a part of the fifth motor. This fifth motor is a three-phase stepping motor which can be employed in the fourth and fifth driving devices described previously. FIG. 30 is connecting diagrams of the field coils and driving coils of this fifth motor.

In this fifth motor, current is supplied to the d.c. field coils 330 and 331 at all times, as a result of which the rotor 129 is excited to have north and south poles, as is shown in FIG. 29, depending on its position while the oppositely positioned driving coils 291 and 295, 292 and 296, and 294 and 298 wound on the field coils are simultaneously excited to have opposing polarities, or north and south poles, respectively. In this connection, it should be noted that the driving coils 332, 333 and 334 of the motor in the fourth and fifth driving devices correspond to the driving coils 291 and 295, 292 and 296, and 298 and 294 of the fifth motor.

When the flow of current is effected by an electrical angle of 120° from phase V to phase U thereby generating field magnetic flux as indicated by directed solid lines (arrows) in FIG. 29, teeth of the field pole 122 repulse those of the rotor 129 while teeth of the field pole 12 attract those of the rotor 129. However, since the electrical angle for the flow of current is 120° as described above, a tooth of the rotor will coincide in position with that of the stator at the position making a mechanical angle of 30° toward the field pole 122 with respect to the center of the field pole 121. This is the condition referred to as the first step of the fifth motor.

Then, the flow of current is effected by an electrical angle of 120° from phase W to phase U thereby generating field magnetic flux as indicated by directed dotted lines. In this operation, since the electrical angle for the flow of current is 120° similarly as in the preceding operation, the coincidence of teeth occurs at the position making an mechanical angle of 30° toward the field pole 128 with the center of the field pole 121, that is, at the position making an mechanical angle of 60° with the position of the first step. This is the second step of the fifth motor. The same operation as described above is carried out with respect to the field poles 124, 125 and 126. Thus, the rotor 129 rotates counterclockwise completing one revolution through six steps.

Figure 31:
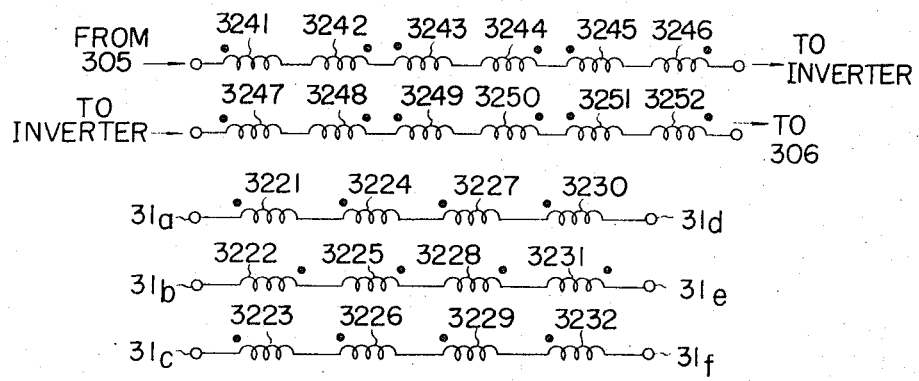
FIG. 31 is also a cross-sectional view illustrating a part of the stepping motor employed in the fourth driving device (FIG. 4) or the fifth one (FIG.5) and having a rotor magnetized to be heteropolar.
Figure 32:
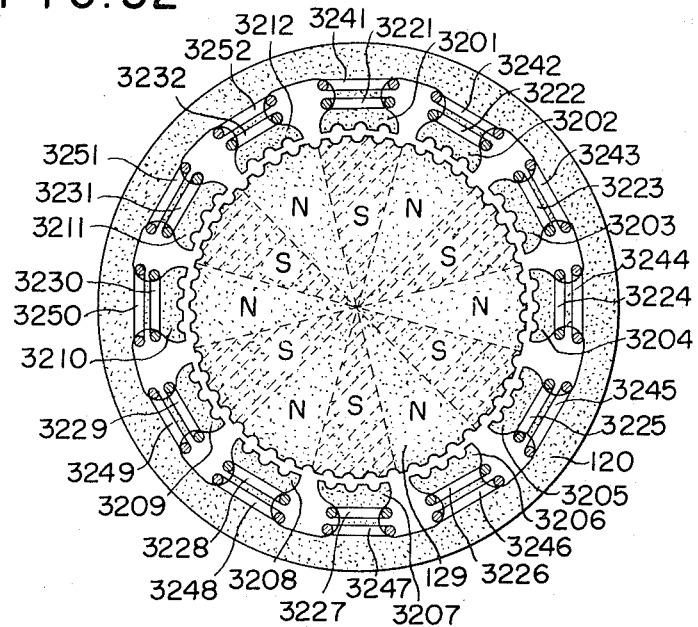
FIG. 32 is connecting diagrams of the field coils and driving coils of the stepping motor shown in FIG. 31.

Another stepping motor according to this invention (hereinafter referred to as a sixth motor when applicable) is shown in FIG. 32 which is also a cross-sectional diagram illustrating a part of the sixth motor. This sixth motor is also a three-phase stepping motor which can be employed in the fourth and fifth driving devices and in which the rotor is excited to have pairs of north and south poles. FIG. 31 is connecting diagrams of d.c. field coils and driving coils of the sixth motor.

In this sixth motor, the d.c. field coils 3241 through 3252 respectively wound on field poles 3201 through 3212 correspond to the d.c. field coils 330 and 331 described previously and induce magnetic polarities in the rotor 129 in such a manner that north and south poles alternately appears as shown in FIG. 32. The driving coils 3221, 3224, 3227 and 3230 having terminals 31a and 31d, the driving coils 3222, 3225, 3228 and 3231 having terminals 31b and 31e, and the driving coils 3223, 3226, 3229 and 3232 having terminals 31c and 31f correspond to the driving coils 332, 333 and 334 described previously with reference to FIG. 4. The flow of electric current to these driving coils are carried out in the same manner as in the fifth motor.

In the sixth motor, selection of the winding beginning ends of the d.c. exciting coils may change the polarization condition of the rotor into that as in the fifth motor or that as in the second rotor.

Consequently, provision of driving devices which can effectively drive stepping motors having small size, a great torque, small noise, small vibration, and a small d.c. reluctance torque can be achieved according to the invention.

We claim:

1. A device for driving a stepping motor which comprises:
   a. a direct current power source;
   b. a constant current chopper for rendering constant electric current to be supplied to a load, or the stepping motor, from the power source, the stepping motor being provided with driving coils classified into four groups corresponding to four phases, the four groups being further divided into two greater groups each of which is energized through a reactor by an output current from the chopper;
   c. a flywheel diode provided on the load side of the chopper;
   d. transistor switches connected in series to the driving coils, for switching the flow of electric current in the driving coil;
   e. a pulse frequency division circuit for controlling the operation of the transistor switches so that in each of the two greater groups a driving coil corresponding to a phase is energized at all times; and
   f. a circuit connecting the d.c. power source to connecting points of the transistor switches through respective diodes.

2. A device for driving a stepping motor as claimed in claim 1 in which the reactors are connected with d.c. field coils exciting a rotor of the stepping motor, respectively.

3. A device for driving a stepping motor as claimed in claim 1 which further comprises d.c. field coils exciting a rotor of the stepping motor connected, at the output side of the power supply, in parallel to the load, or the stepping motor.

4. A device for driving a stepping motor which comprises:
   a. a direct current power source;
   b. two constant current choppers provided at the positive and negative terminals of the power source for the purpose of rendering constant electric current to be supplied from the power source to the stepping motor as a load;
   c. two diodes connected in such a manner as cross connection from two terminals of the constant current chopper provided at the negative terminal of the power source to two terminals of the constant current chopper provided at the positive terminal of the power source so that, when the constant current choppers are off, energy stored in the load is circulated to the power source;
   d. a pair of series circuits, each having a reactor and a d.c. field coil for exciting a rotor of the stepping motor;
   e. a three-phase bridge inverter;

f. a pulse frequency-division circuit for controlling the on-off operation of the three-phase bridge inverter;

g. driving coils of the stepping motor for forming revolving magnetic field with the aid of magnetic field of the rotor by regulation of the flow of electric current from the inverter; and h. a circuit for regenerating energy residual in the driving coils to the power source upon commutation by the inverter.

5. A device for driving a stepping motor which comprises:

a. a d.c. power source;

b. two constant current choppers provided at the positive and negative terminals of the power source for the purpose of rendering constant electric current to be supplied from the power source to the stepping motor as a load;

c. a flywheel diode for circulating residual energy in the load from an input terminal provided on the load side of the constant current chopper provided at the negative terminal of the power source to an output terminal provided on the load side of the constant current chopper provided at the positive terminal of the power source;

d. a pair of series circuits, each comprising a reactor and a d.c. field coil;

e. a three-phase bridge inverter;

f. a pulse frequency division for controlling the on-off operation of the three-phase bridge inverter;

g. driving coils of the stepping motor for forming revolving magnetic field with the aid of magnetic field of the rotor by regulation of the flow of electric current from the inverter; and h. a circuit for regenerating energy residual in the driving coils to the power source upon commutation by the inverter.

6. A device for driving a steeping motor as claimed in claim 1 in which the stepping motor comprises a rotor having a laminated core made of a magnetic substance and $4n$ field poles, the rotor and the field poles being provided and teeth on the confronting surfaces thereof in such a manner as in an inductor type synchronous motor, the field poles being provided with exciting coils so that adjacent field poles are excited to be opposite in polarity to each other with the field poles in one and the same phase being simultaneously excited to be one and the same polarity, and while field poles corresponding to any two phases are excited in the direction of rotation of the stepping motor with the excitation of the adjacent field poles, excitation of the field poles is shifted one phase by one phase.

7. A device for driving a stepping motor as claimed in claim 2 in which the stepping motor comprises a rotor and a stator which is of the same in type as those of an inductor type synchronous motor, the stator being provided with $4n$ field poles, where n representing the positive integer, each of which is provided with two exciting coils different in phase so that exciting coils corresponding to any two phases are excited with all of the exciting coils being excited one phase by one phase, and the rotor is magnetized to be homopolar at its end.

8. A device for driving a stepping motor as claimed in claim 3 in which the stepping motor comprises a rotor and a stator which is of the same in type as those of an inductor type synchronous motor, the stator being provided with $4n$ field poles, where $n$ representing the positive integer, each of which is provided with two exciting coils different in phase so that exciting coils corresponding to any two phases are excited with all of the exciting coils being excited one phase by one phase, and the rotor is magnetized to be homopolar at its end.

9. A device for driving a stepping motor as claimed in claim 7 in which the stator are provided with d.c. field coils so that the end of the rotor be excited to be bipolar, or to have a north pole and a south pole.

10. A device for driving a stepping motor as claimed in claim 7 in which the field poles are provided with rotor-exciting coils, in which direct current flows at all times, so that the end of the rotor be excited to be heteropolor, or to have a plurality of north and south poles.

11. A device for driving a stepping motor as claimed in claim 4 in which the stepping motor is provided with a stator and a rotor which are of the same in type as those of an inductor type synchronous motor, the stator havng $3n$ field poles, where $n$ representing the positive integer, which are provided with three-phase-connected driving coils, and two d.c. field coils so that an end of the rotor be rendered to be bipolar, or to have a north pole and a south pole.

12. A device for driving a stepping motor as claimed in claim 5 in which the stepping motor is provided with a stator and a rotor which are of the same in type as those of an inductor type synchronous motor, the stator having $3n$ field poles, where n representing the positive integer, which are provided with three-phase-connected driving coils, and two d.c. field coils so that an end of the rotor be rendered to be bipolar, or to have a north pole and a south pole.

13. A device for driving a stepping motor as claimed in claim 4 in which the stepping motor comprises a rotor and a stator which are of the same in type as those of an inductor type synchornous motor, the stator having $3n$ field poles, where n representing the positive integer, which are, provided with three-phase-connected driving coils and further provided with d.c. field coils for exciting an end of the rotor to be homopolar or heteropolar.

14. A device for driving a stepping motor as claimed in claim 5 in which the stepping motor comprises a rotor and a stator which are of the same in type as those of an inductor type synchronous motor, the stator having $3n$ field poles, where n representing the positive integer, which are provided with three-phase-connected driving coils and further provided with d.c. field coils for exciting an end of the rotor to be homopolar or heteropolar.

* * * * *

UNITED STATES PATENT OFFICE
CERTIFICATE OF CORRECTION

Patent No. 3,826,966     Dated July 30, 1974

Inventor(s) NAGAHIKO NAGASAKA ET AL.

It is certified that error appears in the above-identified patent and that said Letters Patent are hereby corrected as shown below:

Front page, at "[30] Foreign Application Priority Data" kindly change to read as follows:

-- Aug. 10, 1972   Japan .............. 47-80582
   Mar. 16, 1973   Japan .............. 48-31120
   Mar. 22, 1973   Japan .............. 48-33711 --.

Column 1, line 9, change "provided to" to -- provided with --.
Column 3, line 48, change "firat" to -- first --; line 62, change "FIGS. 10" to -- FIGS. 19 --.
Column 7, line 41, change "3835, j.k. J.K." to -- 3835, J.K. --.
Column 10, line 46, change "arraned" to -- arranged --.

Signed and sealed this 5th day of November 1974.

(SEAL)
Attest:

McCOY M. GIBSON JR.
Attesting Officer

C. MARSHALL DANN
Commissioner of Patents